United States Patent
Jurik et al.

(10) Patent No.: US 10,132,992 B2
(45) Date of Patent: Nov. 20, 2018

(54) SPECIAL FLOWER EFFECTS BEAM AND WASHLIGHT LUMINAIRE

(71) Applicant: Robe Lighting s.r.o., Roznov pod Radhostem (CZ)

(72) Inventors: Pavel Jurik, Prostredni Becva (CZ); Josef Valchar, Prostredni Becva (CZ)

(73) Assignee: Robe Lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 15/089,116

(22) Filed: Apr. 1, 2016

(65) Prior Publication Data

US 2017/0090115 A1  Mar. 30, 2017

Related U.S. Application Data

(63) Continuation-in-part of application No. 15/075,191, filed on Mar. 20, 2016.

(51) Int. Cl.
| | |
|---|---|
| *F21V 7/04* | (2006.01) |
| *F21V 8/00* | (2006.01) |
| *F21V 14/06* | (2006.01) |
| *F21V 21/28* | (2006.01) |
| *F21V 3/04* | (2018.01) |

(Continued)

(52) U.S. Cl.
CPC .............. *G02B 6/0096* (2013.01); *F21V 3/04* (2013.01); *F21V 5/007* (2013.01); *F21V 5/02* (2013.01); *F21V 5/04* (2013.01); *F21V 14/006* (2013.01); *F21V 14/06* (2013.01); *F21V 21/28* (2013.01); *G02B 5/02* (2013.01); *G02B 27/30* (2013.01);

(Continued)

(58) Field of Classification Search
CPC ......... G02B 6/0096; G02B 5/02; F21V 14/06; F21V 21/28; F21V 5/02; F21V 5/007; F21V 14/006
See application file for complete search history.

(56) References Cited

U.S. PATENT DOCUMENTS

| 8,525,999 B2 | 9/2013 | Brukilacchio |
| 9,261,269 B2 | 2/2016 | Jurik et al. |
(Continued)

FOREIGN PATENT DOCUMENTS

| EP | 2177816 A2 | 10/2009 |
| WO | 2010113100 A1 | 10/2010 |
(Continued)

OTHER PUBLICATIONS

Office Action dated Jul. 7, 2017; U.S. Appl. No. 15/075,191, filed Mar. 20, 2016; 6 pages.

(Continued)

*Primary Examiner* — Ali Alavi
(74) *Attorney, Agent, or Firm* — Conley Rose, P.C.; Grant Rodolph; Brooks W Taylor

(57) ABSTRACT

Presented is a multiparameter automated luminaire comprised of a plurality of light engine modules, a plurality of which by design homogenize light emitted by its light sources more fully than at least one of the light engine modules, which is intentionally designed to noticeably not fully homogenize the light emitted by its light sources. In the preferred embodiment, the non homogenizing light engine module also includes light modulators optionally engagable to more fully homogenize the light output from that light engine module.

5 Claims, 12 Drawing Sheets

(51) Int. Cl.
*F21V 5/02* (2006.01)
*F21V 5/00* (2018.01)
*F21V 5/04* (2006.01)
*G02B 27/30* (2006.01)
*G02B 5/02* (2006.01)
*F21V 14/00* (2018.01)
*F21Y 115/10* (2016.01)
*F21Y 113/13* (2016.01)
*F21W 131/406* (2006.01)

(52) U.S. Cl.
CPC .... *F21W 2131/406* (2013.01); *F21Y 2113/13* (2016.08); *F21Y 2115/10* (2016.08)

(56) References Cited

U.S. PATENT DOCUMENTS

| | | | |
|---|---|---|---|
| 2007/0024971 A1* | 2/2007 | Cassarly | G02B 6/0008 359/485.03 |
| 2010/0188018 A1 | 7/2010 | Salm | |
| 2011/0170289 A1 | 7/2011 | Allen et al. | |
| 2012/0243215 A1* | 9/2012 | Jurik | G02B 27/0994 362/217.01 |
| 2015/0092418 A1 | 4/2015 | Jurik et al. | |
| 2015/0103553 A1 | 4/2015 | Jurik | |
| 2016/0018064 A1 | 1/2016 | Jurik et al. | |
| 2016/0040854 A1* | 2/2016 | Zhang | H01L 25/0753 362/242 |
| 2016/0054646 A1* | 2/2016 | Chang | G03B 21/204 353/31 |
| 2017/0269292 A1 | 9/2017 | Jurik et al. | |

FOREIGN PATENT DOCUMENTS

| | | |
|---|---|---|
| WO | 2013184600 A1 | 12/2013 |
| WO | 2014031641 A1 | 2/2014 |
| WO | 2015051034 A2 | 4/2015 |
| WO | 2015138476 A2 | 9/2015 |
| WO | 2015138483 A2 | 9/2015 |

OTHER PUBLICATIONS

Notice of Allowance dated Dec. 1, 2017; U.S. Appl. No. 15/075,191, filed Mar. 20, 2016; 8 pages.
PCT International Search Report; Application No. PCT/US2017/023205; dated Aug. 1, 2017; 3 pages.
PCT Written Opinion of the International Searching Authority; Application No. PCT/US2017/023205; dated Aug. 1, 2017; 6 pages.
PCT International Search Report; Application No. PCT/US2017/025658; dated Aug. 23, 2017; 3 pages.
PCT Written Opinion of the International Searching Authority; Application No. PCT/US2017/025658; dated Aug. 23, 2017; 5 pages.
Office Action dated Mar. 29, 2018; U.S. Appl. No. 15/075,191, filed Mar. 20, 2016; 14 pages.
Notice of Allowance dated Jul. 24, 2018; U.S. Appl. No. 15/075,191, filed Mar. 20, 2016; 7 pages.

* cited by examiner

3a

3b

SPECIAL FLOWER EFFECTS BEAM AND WASHLIGHT LUMINAIRE

CROSS-REFERENCE TO RELATED APPLICATIONS

This application is a continuation in part of U.S. patent application Ser. No. 15/075,191 filed Mar. 20, 2016 by Pavel Jurik, et al. entitled, "Special Flower Effects Beam and Washlight Luminaire".

TECHNICAL FIELD OF THE DISCLOSURE

The present disclosure generally relates to a method for providing a wash light luminaire, specifically to optical systems and a method relating to providing single and multiple beams from a wash light luminaire.

BACKGROUND OF THE DISCLOSURE

Luminaires with automated and remotely controllable functionality are well known in the entertainment and architectural lighting markets. Such products are commonly used in theatres, television studios, concerts, theme parks, night clubs, and other venues. A typical product will provide control over the functions of the luminaire allowing the operator to control the intensity and color of the light beam from the luminaire that is shining on the stage or in the studio. Many products also provide control over other parameters such as the position, focus, beam size, beam shape, and beam pattern. In such products that contain light emitting diodes (LEDs) to produce the light output it is common to use more than one color of LEDs and to be able to adjust the intensity of each color separately such that the output, which comprises the combined mixed output of all LEDs, can be adjusted in color. For example, such a product may use red, green, blue, and white LEDs with separate intensity controls for each of the four types of LEDs. This allows the user to mix almost limitless combinations and to produce nearly any color they desire.

FIG. 1 illustrates a typical multiparameter automated luminaire system 10. These systems typically include a plurality of multiparameter automated luminaires 12 which typically each contain on-board a light source (not shown), light modulation devices, electric motors coupled to mechanical drive systems, and control electronics (not shown). In addition to being connected to mains power either directly or through a power distribution system (not shown), each automated luminaire 12 is connected is series or in parallel to data link 14 and to one or more control desks 15. The luminaire system 10 is typically controlled by an operator through the control desk 15.

Luminaires have been provided using non-LED light sources designed to produce a single narrow beam or a plurality of such beams. Such luminaires may use low etendue, High Intensity Discharge (HID) light sources with a small arc gap in order to facilitate the production of tight, almost parallel light beams. U.S. patent application Ser. Nos. 14/042,758 and 14/042,759 provide examples of such a system. Single and multi-color LED sourced luminaires have also been produced with narrow beam capability using sophisticated collimation systems as, for example, disclosed in U.S. patent application Ser. No. 14/405,355. LEDs however are high etendue light sources by comparison with HID and it is difficult to produce multiple beam systems using LED light sources.

Prior art optical systems utilizing multiple LED emitters may be unforgiving when it is desired to produce a homogeneous image with a light output capable of being blended between units to provide seamless coverage. This mode of operation is often called a wash light as it washes the stage with light. Prior art systems will commonly utilize multiple LED light sources and attempt to blend them into a homogeneous whole. This approach is often unsuccessful because the individual differently colored LED emitters are still visible producing a multi-colored effect when viewing the light rather than the desired appearance of a single color. Other prior art systems use a secondary lens but that has the drawback that the output lens may not then be filled completely and all the light will appear to be emitted from a portion at the centre of the output lens. This reduces the performance of the luminaire as a wash light as it is an important feature of wash luminaires that the effective light source be as large as possible in order to soften and reduce shadowing.

There is a need for a method for producing and controlling a light beam or multiple light beams from an LED sourced wash light luminaire to produce controllable lighting effects from a luminaire with a wash light distribution with a large effective source and true blending output distribution.

BRIEF DESCRIPTION OF THE DRAWINGS

For a more complete understanding of the present disclosure and the advantages thereof, reference is now made to the following description taken in conjunction with the accompanying drawings in which like reference numerals indicate like features and wherein.

DETAILED DESCRIPTION OF THE DISCLOSURE

Preferred embodiments of the present disclosure are illustrated in the Figures, like numerals being used to refer to like and corresponding parts of the various drawings.

The present disclosure generally relates to a method for providing special effects in wash light luminaires, specifically to a method relating to providing controllable lighting effects from a luminaire with a wash light distribution with a large effective source and true blending output distribution.

Figure 2:
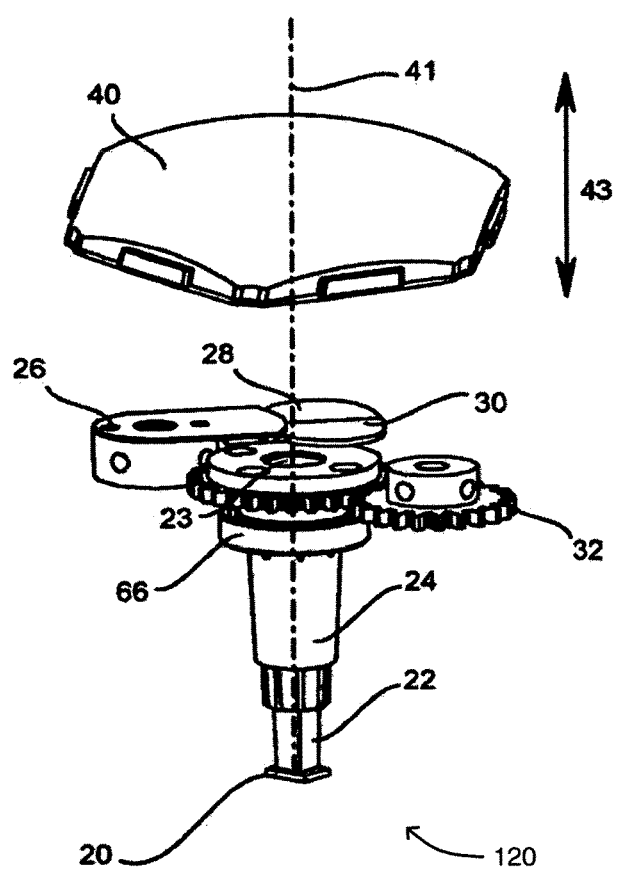
FIG. 2 illustrates the layout of embodiments of major components of a light engine of a luminaire generating a flower effect.

FIG. 2 illustrates the layout of embodiments of major components of one light engine 120 of a luminaire generating a flower effect. Light emitting module 20 comprises a single LED or an array of LEDs, which may include a primary optic (not shown). Light emitting module 20 may contain a single color of LEDs or may contain multiple dies, each of which may be of common or differing colors. For example, in one embodiment light emitting module 20 may comprise one each of a Red, Green, Blue and White LED. In further embodiments light emitting module 20 may comprise a single LED chip or package while in yet further embodiments light emitting module 20 may comprise multiple LED chips or packages either under a single primary optic or each package with its own primary optic. In some embodiments these LED die(s) may be paired with optical lens element(s) as part of the LED light-emitting module. In a further embodiment light emitting module 20 may comprise more than four colors of LEDs. For example, seven colors may be used, one each of a Red, Green, Blue, White, Amber, Cyan, and Deep Blue/UV LED die.

The light output from the LEDs in light emitting module 20 enters light guide optic 22 contained within protective sleeve 24. Light guide optic 22 may be a device utilizing internal reflection so as to collect, homogenize and constrain, and conduct the light to exit port 23. Light guide optic 22 may be a hollow tube with a reflective inner surface such that light impinging into the entry port may be reflected multiple times along the tube before leaving at the exit port 23. Light guide optic 22 may be a square tube, a hexagonal tube, a heptagonal tube, an octagonal tube, a circular tube, or a tube of any other cross section. In a further embodiment, light guide optic 22 may be a solid rod constructed of glass, transparent plastic, or other optically transparent material where the reflection of the incident light beam within the rod is due to "total internal reflection" (TIR) from the interface between the material of the rod and the surrounding air. The integrating rod may be a square rod, a hexagonal rod, a heptagonal rod, an octagonal rod, a circular rod, or a rod of any other cross section. Light guide optic 22, whether solid or hollow, and with any number of sides, may have entry port 21 and exit port 23 that differ in cross sectional shape. For example, a square entry port 21 and an octagonal exit port 23. Further, light guide optic 22 may have sides which are tapered so that the entrance aperture is smaller than the exit aperture. The advantage of such a structure is that the divergence angle of light exiting the light guide optic 22 at exit port 23 will be smaller than the divergence angle for light entering the light guide optic 22. The combination of a smaller divergence angle from a larger aperture serves to conserve the etendue of the system. Thus, a tapered light guide optic 22 may provide similar functionality to a condensing optical system. In a preferred embodiment of the disclosure, light guide 22 has both a square entry port 21 and a square exit port 23. For the desired flower reminiscent effect, it is advantageous to use shapes with opposing sides and to have the same shape cross section along the length of the light guide optic 22.

Light guide optic 22 may have an aspect ratio where its length is much greater than its diameter. The greater the ratio between length and diameter, the better the resultant mixing and homogenization will be. Light guide optic 22 may be enclosed in a tube or protective sleeve 24 that provides mechanical protection against damage, scratches, and dust. In the preferred embodiment, light guide optic 22 is of such a length so as to collimate and direct but deliberately provide incomplete homogenization of the light coming from individual LEDs on light emitting module 20. This incomplete homogenization may be advantageously utilized in the remainder of the optical system. Similarly, the exit port of light guide optic 22 is polished, rather than being diffused or textured, to maintain the incomplete homogenization of the input light beams. In one embodiment, the beams are less than 50% homogenized such that individual beams or colors from separate LEDs are still clearly visible.

Light guide optic 22 within its protective sleeve 24 is mounted such that it may be freely rotated along its long, optical, axis through gear 32 and motor (not shown) supported by bearing 66. Rotating light guide optic 22 will cause the emitted light beams from exit port 23 to also rotate around the optical axis of the system. In fact, the light beam movement and rotation will be complex, as a function of the rotation of the input port of light guide optic 22 across the array of LEDs in fixed light emitting module 20 and the total internal reflection within the rotating light guide. Thus the light beams exiting the light guide optic 22 will present a complex and dynamic pattern of moving beams. Light guide optic 22 may be rotated in either direction and at any speed under control of the operator.

With the disclosure in its basic form, the light from the exit port 23 of light guide optic 22 will be directed towards and through lens 40 that serves to further control the angle of the emitted light beam. Lens 40 may be moved towards and away from light guide optic 22 in the direction 43 along the optical axis of the system shown by line 41. In the position where lens 40 is at its furthest separation from the exit port 23 of light guide optic 22 the emitted light beam will have a narrow beam angle. In the position where lens 40 is at its closest separation from the exit port 23 of light guide optic 22 the emitted light beam will have a wide beam angle. Intermediate positions of lens 40 with respect to exit port 23 of light guide optic 22 will provide intermediate beam angles. Lens 40 may advantageously be configured as an achromat so as to minimize chromatic aberration of the emitted light beam or beams. The system illustrated herein utilizes a single lens element as lens 40 to provide output beam control. The disclosure is, however, not so limited, and further embodiments may contain different numbers and types of lenses or other optical systems as well known in the art. In particular, further embodiments may utilize systems where lens 40 comprises multiple elements. In further embodiments, lens 40 may comprise a number of optical lens elements whose relationship to each other is not fixed, and can alter. The elements of lens 40 may be meniscus lenses, plano convex lenses, bi-convex lenses, holographic lenses, aspheric lenses, or other lenses as well known in the art. The elements of lens 40 may be constructed of glass, transparent plastic, or other optically transparent material as known in the art.

In a preferred embodiment, lens 40 comprises a single element constructed, by the use of aspheric surfaces or otherwise, to exhibit achromatic properties such that the colors in the light beam remain homogenized and do not produce objectionable colored fringing to the light beam.

With the layout as described, the effect from the luminaire will be that of a complex pattern of a plurality of light beams created by the reflection of the individual beams from the LEDs in light emitting module 20 within light guide optic 22. As no diffusion or other homogenization is provided, these beams will remain in differing colors and patterns through projection lens system comprising lens 40. As the light guide optic 22 is rotated, and lens 40 is moved towards and away from the exit port 23 of light guide optic 22, the effect will be that of a flower or spreading pattern of beams that opens and closes as the lenses are moved.

To change the luminaire into wash light mode instead of beam effect, diffuser arm 26 may be swung across the light beam proximate to exit port 23 of light guide optic 22. Diffuser arm 26 may contain a number of diffusers each of which may have different diffusion properties. In the embodiment illustrated, diffuser arm 26 is fitted with first diffuser 28 and second diffuser 30, however further embodiments may have differing numbers of diffusers. In operation diffuser arm 26 is rotated such that one of the diffusers 28 or 30 is positioned proximate to exit port 23 of light guide optic 22 and will serve to diffuse and homogenize the light beams emitting from exit port 23 before they pass into the remainder of the optical system. The diffuser serves to merge the light beams into a single homogenized beam and to increase the spread of the light beam. Differing strengths or properties of diffuser 28 or 30 may provide narrow or wide homogenized beams without the flower effect or, for lower powered diffusers a softening of the flower effect. In this mode of operation lens 40 will continue to control the overall size of the homogenized beam.

Figure 3:
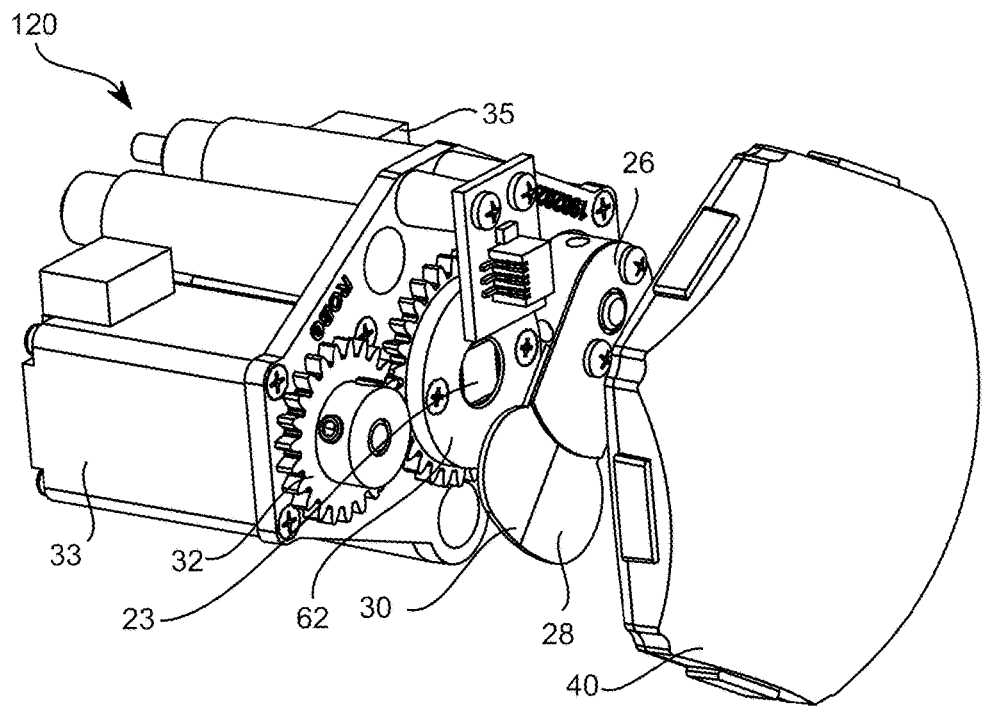
FIG. 3 illustrates more detail of some of the embodiments of the major components and layout of the light engine illustrated in FIG. 2.
Figure 3:
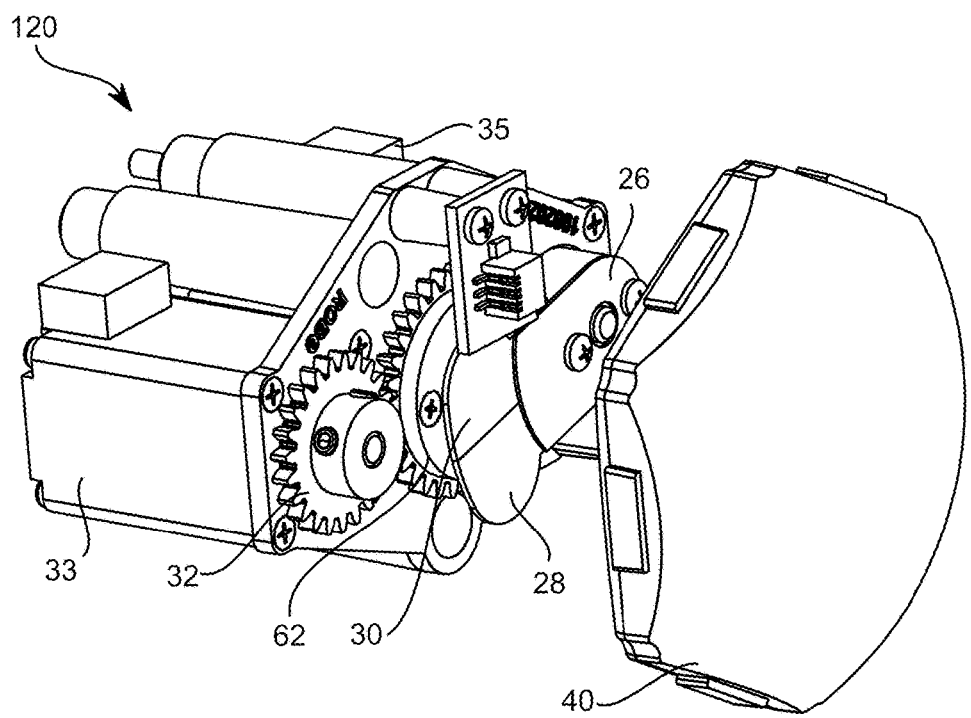

FIG. 3 illustrates more detail of some of the embodiments of the major components and layout of the light engine 120 illustrated in FIG. 2. More specifically, in FIG. 3, exit port 23 of light guide optic 22 and the means for moving diffuser 28 and 30 across that exit port can more clearly be seen. Sub FIG. 3a illustrates the system in beam flower effect mode where diffuser arm 26 is rotated such that neither diffuser 28 nor diffuser 30 are positioned across exit port 23. In this position the undiffused light beam presents the flower effect.

Motor 33 provides the motion for rotating light guide optic 22 through gear 32, and motor 35 provides the motion for diffuser arm 26. Similar motors and drive systems as well known in the art provide the motion for lens 40 along the optical axis of the luminaire. Motors 33 and 35 may be stepper motors, servo motors, linear actuators, solenoids, DC motors, or other mechanisms as well known in the art. In the embodiment shown, the motors 33 and 35 operate through gear systems. For example, motor 33 drives gear 32. Other mechanisms for actuating the desired movement as are well known in the art are also contemplated.

Sub FIG. 3b illustrates the system in wash light mode where diffuser arm 26 is rotated such that second diffuser 30 is positioned across exit port 23. In this position the light beam is diffused by second diffuser 30 and presents a homogenized beam without the flower effect.

Figure 4:
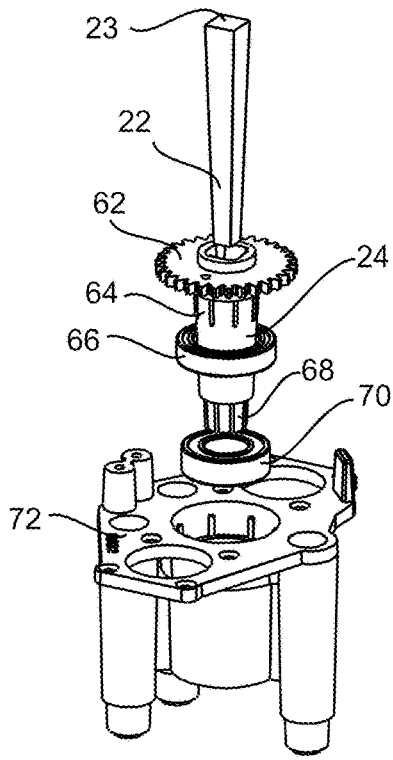
FIG. 4 illustrates an embodiment of additional support structure for the light guide assembly.
Figure 4:
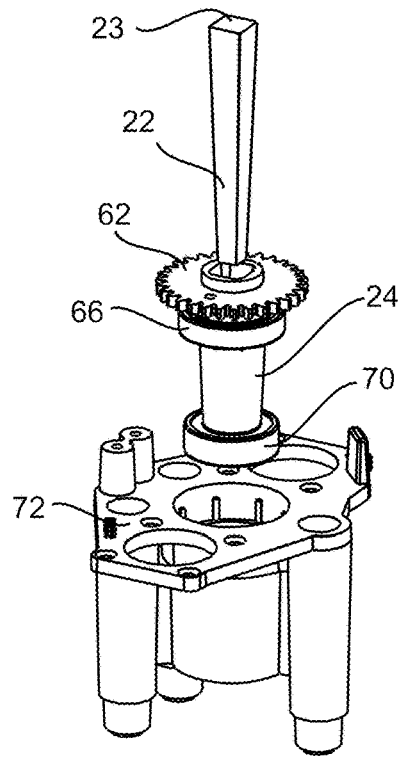
Figure 4:
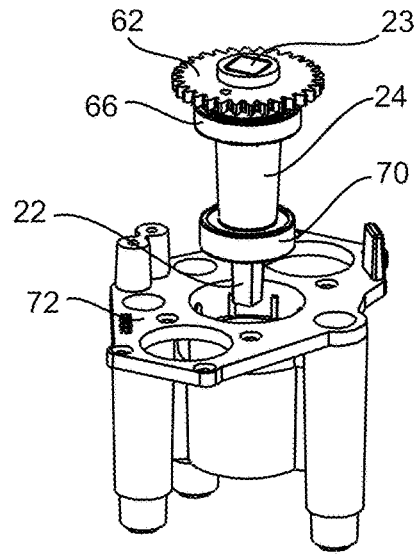
Figure 4:
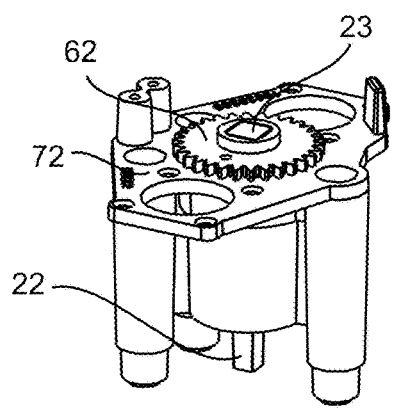

FIG. 4 illustrates the light guide assembly including its support structure. Sub FIGS. 4a, 4b, 4c, and 4d show the assembly from fully exploded (4a) through fully assembled (4d) to aid comprehension of the structure. Light guide optic 22 with exit port 23 is inserted into protective sleeve 24. Protective sleeve 24 has, as part of its structure, bearing support surfaces 64 and 68. Bearing support surfaces 64 and 68 engage with bearings 66 and 70 respectively. This allows protective sleeve 24 (and thus light guide optic 22) to rotate within bearings 66 and 70. Also attached to protective sleeve 24 is gear 62 which meshes with gear 32 shown in FIG. 3 that is in turn driven by motor 33. The assembly formed by protective sleeve 24, light guide optic 22, bearings 66 and 70, and gear 62, is supported within holder 72 such that (as shown in FIG. 4d) light guide optic 22 protrudes from the base of holder 72 and aligns with light emitting module 20. This assembly also serves to maintain a small separation between entry port 21 of light guide optic 22 and light emitting module 20 such that light transfer from light emitting module 20 and light guide optic 22 is maximized but the two surfaces do not touch.

It is envisaged that light guide assemblies as shown in FIG. 4 could be used in multiples or arrays within a single luminaire. For example, an array of rotating light guide assemblies may be used where each light guide is positioned above its own light emitting module. In these embodiments a single motor may drive the rotation of multiple light drive assemblies.

Figure 5:
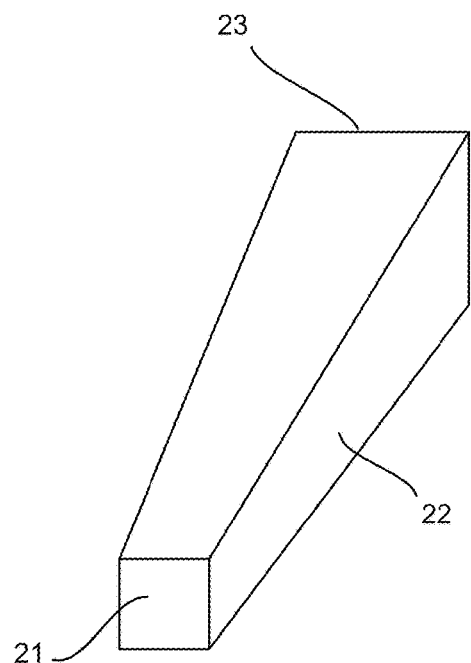
FIG. 5 illustrates an embodiment of a light guide without any supporting structure.

FIG. 5 illustrates an embodiment of a light guide optic 22 without its support structure. Light guide optic 22 contains entry port 21 and exit port 23. In the embodiment illustrated, light guide optic 22 is tapered and has both a square entry port 21 and a square exit port 23.

Figure 6:
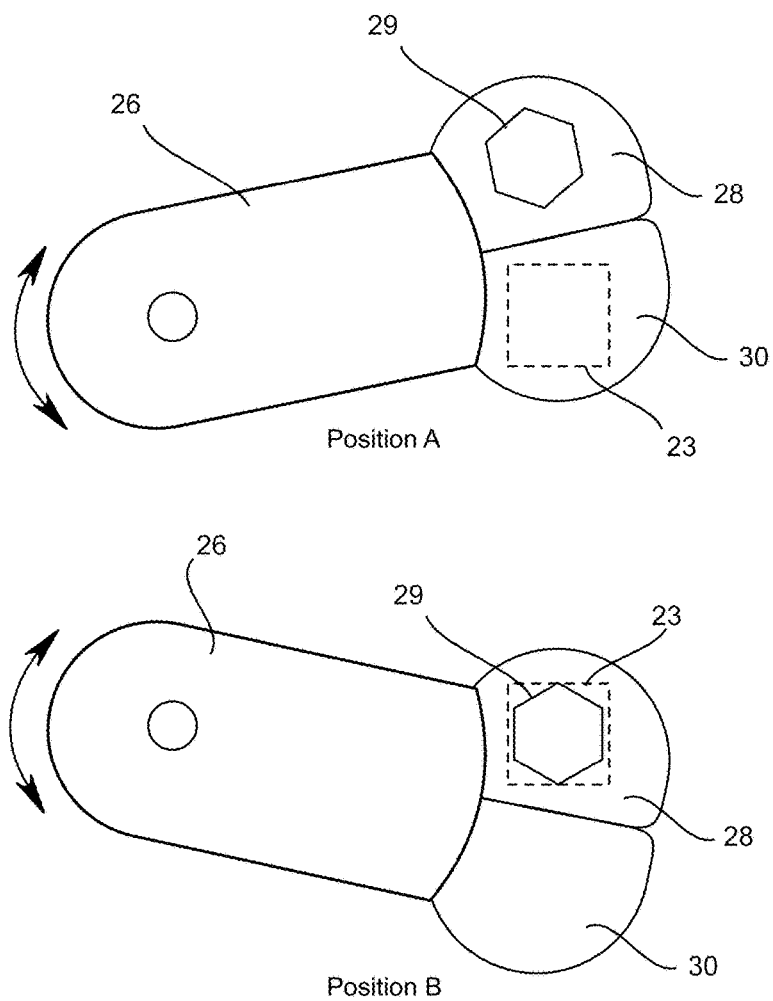
FIG. 6 illustrates detail of an embodiment of the optical softening diffuser arm.

FIG. 6 illustrates detail of an embodiment of the optical softening diffuser arm 26. Diffuser arm 26 is shown in two positions in FIG. 6. In position A, diffuser arm 26 is positioned such that second diffuser 30 is across exit port 23 (shown dashed as it is under the diffuser). Also illustrated is an optional feature of diffuser arm 26. First diffuser 28 includes mask 29 which serves to constrain the light to a masked shape. Mask 29 is an opaque mask with a central open aperture with, in this case, a hexagonal shape. Mask 29 helps to constrain the projected beam into a more rounded, non square, shape. Mask 29 may be of any shape, not just the hexagon illustrated herein, including but not limited to circular, hexagonal, or octagonal.

In position B, diffuser arm 26 is positioned such that first diffuser 28 including mask 29 is across exit port 23 (shown dashed as it is under the diffuser). Diffusers 28 and 30 may offer differing amounts or types of diffusion producing different beam spreads in the output. Diffusers 28 and 30 may be patterned or molded glass, or plastic, or may be holographic diffusers or other diffuser types as well known in the art. Although two different diffusers 28 and 30 are shown here the disclosure is not so limited and any number of diffusers or homogenizers may be affixed and selected as part of diffuser arm 26.

Figure 7:
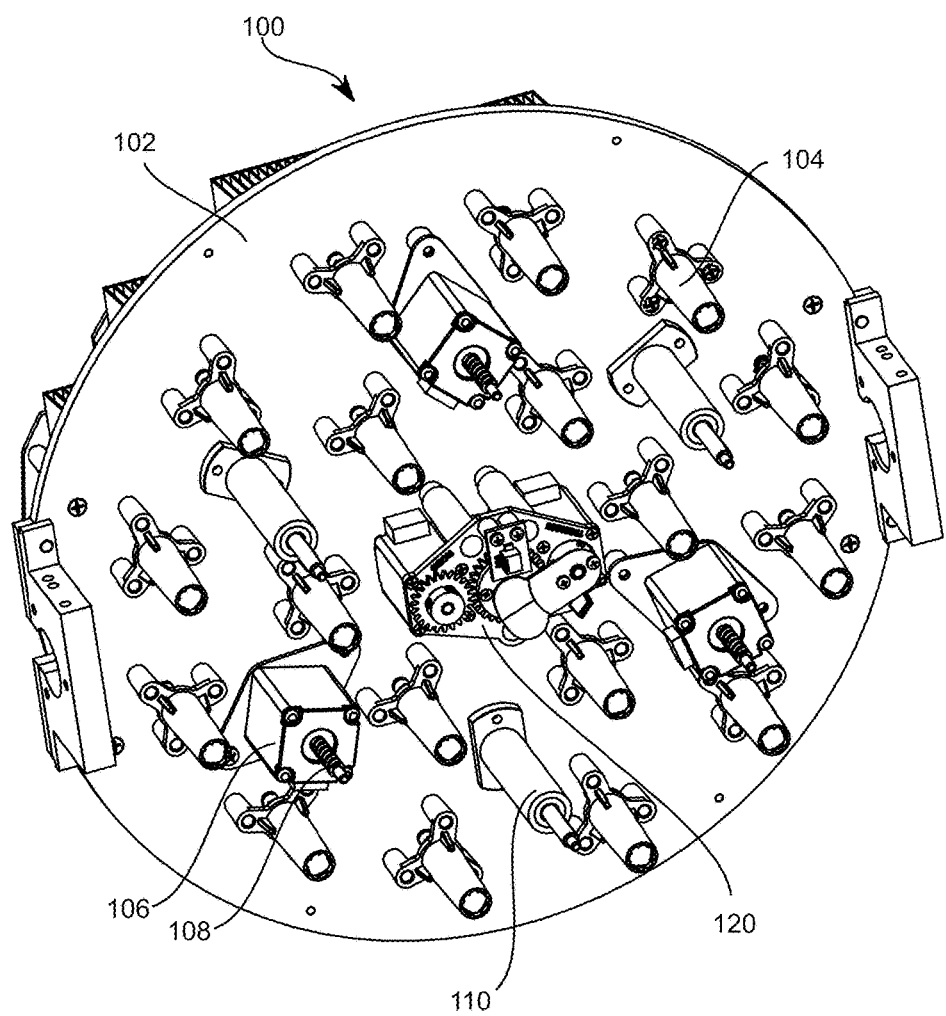
FIG. 7 illustrates a luminaire including an embodiment of the light guide.

FIG. 7 illustrates the layout of the optical support plate 100 of an alternative embodiment of a wash light with special effects luminaire employing an array of light engine modules. Optical support plate 100 comprises a mounting plate 102 to which are mounted a number of LED light sources each with their own associated light guide 104. In the illustrated embodiment 19 LED light sources arranged with a single centre LED light source having two concentric rings of 6 and 12 LED light sources around it are utilized, but in practice use of any number is envisaged. For example, the outer ring may be omitted providing a system with 7 LED light sources, or an extra ring or rings may be added providing larger numbers of LED light sources. The 19 LED light sources and light guides 104 are here arranged in concentric rings but may be also arranged in other configurations. Some percentage of the LED light sources and light guides 104 may be fitted with the optical softening diffuser arm 26 system to provide a module as illustrated in FIGS. 2 through 6. In the embodiment illustrated, a single central LED light source is fitted with the system as optical softening diffuser system (light engine) 120. In practice any number of the light guides 104 may be fitted with optical softening diffuser system 120. However, in a preferred embodiment, the use of a single centrally mounted light engine 120 surrounded by LED light sources with "fully homogenizing" or at least more homogenizing light guides 104 provides a good combination of effects and standard wash light usage. Light guides 104 that are not fitted with light engine 120 may have the exit ports patterned, textured, or diffused or may have diffusion filters similar to diffusers 28 and 30 permanently attached to or constructed as part of the exit port of the light guide or the light guides may be otherwise designedly shaped to "fully homogenize" light such that these guides always produce a smooth, homogenized light output. In contrast, light guides 104 that are fitted with optical softening diffuser system 120 may be remotely controlled to produce either a smooth homogenized output, or a harder edged flower effect as desired by inserting or removing the diffusers 28 and 30 across the beam.

Figure 8:
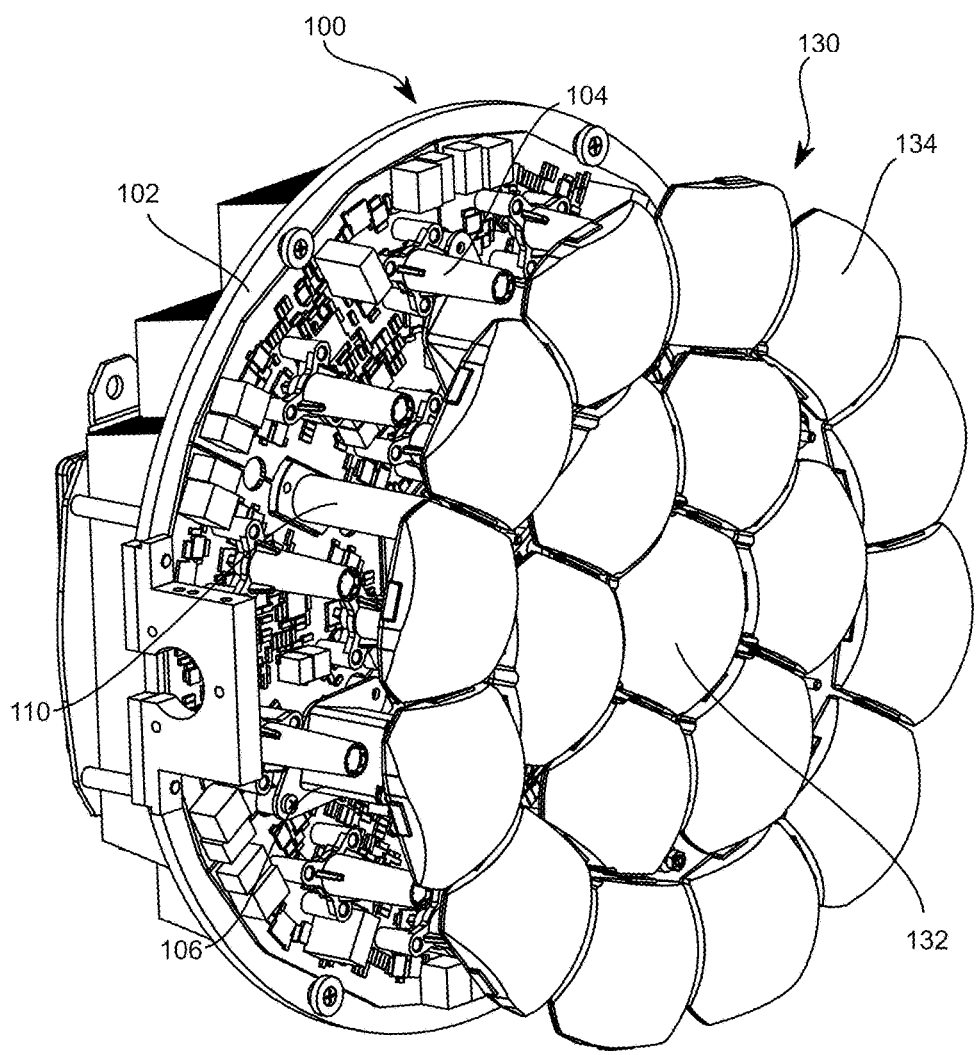
FIG. 8 illustrates FIG. 7 with the output lenses in place.

FIG. 8 illustrates the system shown in FIG. 7 with the optical support plate 100, this time fitted with output lens module 130. Output lens module 130 contains an array of lenses, equal in number to the LED light sources and associated light guides shown in FIG. 7. The lenses may be of differing outline shapes in order to fit together into an aesthetically pleasing design and also to minimize any space wasted in between lenses. Such gaps between lenses may reduce the output of the system, and produce undesirable visible gaps in light output when viewing the luminaire. The design presented here is similar to that of a spider's web and provides both functional purpose and aesthetic appeal. The lenses, although of differing shapes, may have substantially the same optical properties. For example, central lens 132 may be the same optical strength and provide the same optical effect as edge lens 134. In other embodiments, the lenses associated with LED light sources that are fitted with light engine 120, such as the central lens 132 associated with the central LED light source in FIG. 7, may have the same or different optical properties as the edge lenses 134 associated with standard light guide 104.

Figure 9:
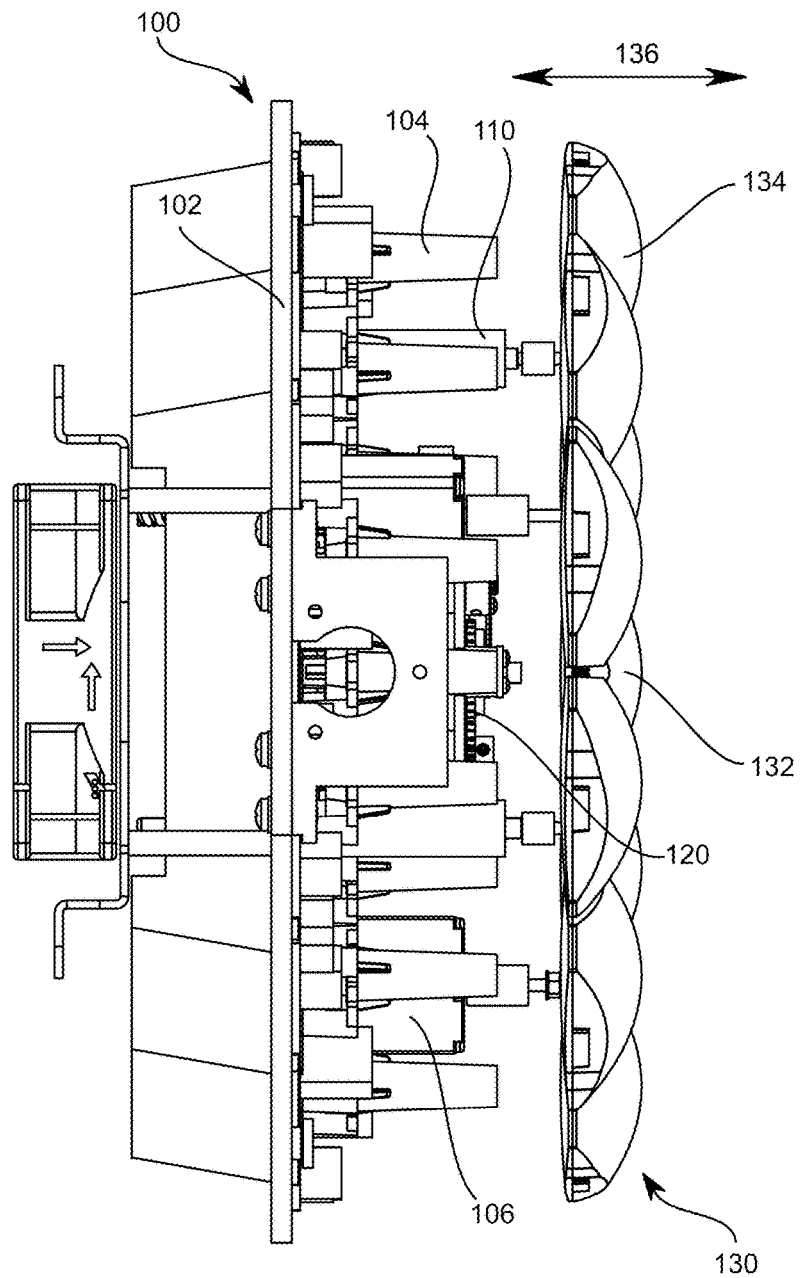
FIG. 9 illustrates detail of an embodiment of the optical system with the lenses in the wide angle position.
Figure 10:
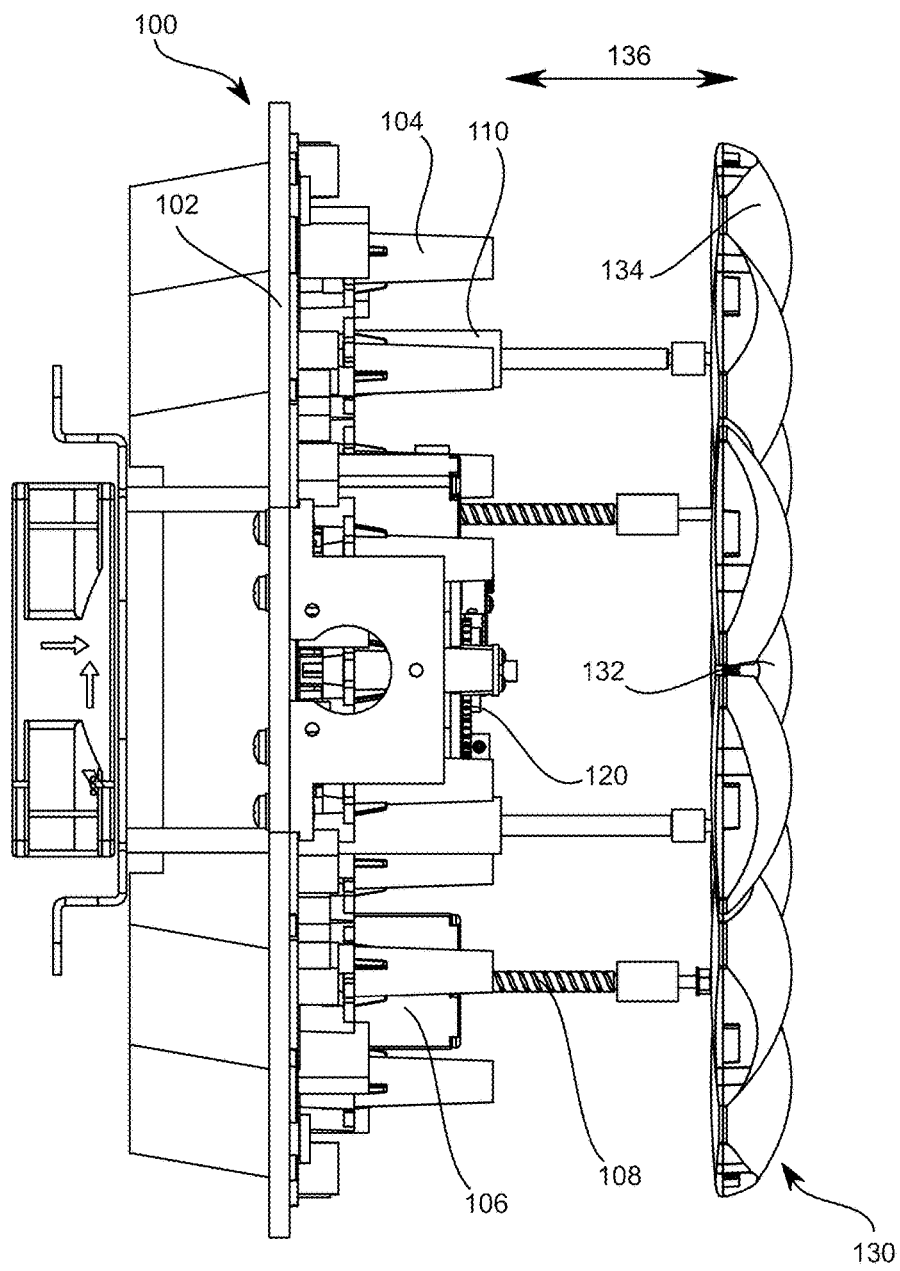
FIG. 10 illustrates detail of an embodiment of the optical system with the lenses in the narrow angle position.

FIGS. 9 and 10 illustrate side elevation views of the system as shown in FIG. 8. In FIG. 9 the output lens module 130 containing an array of lenses 134 and 132 is positioned close to the light guides 104 and optical softening diffuser system 120 on the central light engine module. In the embodiment illustrated only the central light engine module (light engine 120) is of the reduced homogenization type in a center position. In other embodiments this type of module can be placed in a non central location. In further embodiments there may be more than one of these types of light engines 120. While the reduced homogenizing module may include an electable diffusion module so that its light may be included in a full wash light mode, in other embodiments a full wash light mode can be achieved by a reduced homogenizing light module without a diffuser but a system that dims to dim out such light modules during a full wash light mode. This dimming may be automatically tied in operation when the user selects a full wash mode or in other embodiments it might be manual. In further embodiments, all of the modules are of the reduced homogenization type and they all have selectable diffusion module(s). In some embodiments the individual light engine modules are controlled individually and in other embodiments the modules are controlled in groups. The groups may be of like with like or of like geometric location in the array such as outer ring, inner ring, etc. These controls may include a color intensity diffusion flag if so equipped, image multiplier if so equipped, and zoom lens if mechanically configured to be independently controllable (not shown in the figures).

In the position of output from lenses 134 and 132 in FIG. 9 the light output will be at a wider angle. In FIG. 10 output lens module 130 has been moved in direction 136 away from light guides 104 and light engine 120. In this position the output from lenses 134 and 132 will be a narrow angle. Positions of lens module 130 intermediate to those positions shown in FIGS. 9 and 10 will produce intermediate beam angles. As the lens module is moved there will be a continuously variable beam angle, or zoom, of the light beams emitted from the light guides 104.

If optical diffusers 28 and 30 are not positioned across the beam in light engine 120 then the lens when it is in its distant, narrow angle, position may be focused on the LED and the multiple internal reflections in light guides optically multiply the chip shape which creates a sharp distinct flower effect. If the lens is moved to the close, wide angle, position then, even without the diffusers 28 and 30 in place, light engine 120 will produce a smoother wash style beam with less distinct flower effect. In either case, with diffuser 28 or 30 in place the system in light engine 120 will produce a smooth homogenized effect, without the flower effect.

In the embodiment illustrated, the movement of output lens module 130 is produced by motors 106 acting on lead screws 108. Although a lead screw system is illustrated here, the disclosure is not so limited and other methods of moving the lenses such as belt systems, linear actuators, rack and pinion gears, and other methods well known in the art are envisaged. The output lens module 130 is supported by guides 110 such that the motion is constrained to be back and forth along the optical axis of the luminaire.

In the embodiment illustrated the entire array of lenses 134 and 132 moves together as a single module. However, in further embodiments individual lenses or groups of lenses may have their own motor drive systems and be capable of independent movement along the optical axis. In particular, any lenses associated with LED light sources that are fitted with light engines 120, such as the central light engine module in FIG. 7, may move with the output lens module 130, may be fitted with independent motor control separate from that for the output lens module 130, or may be static with a fixed beam angle.

The design of lenses 132 and 134 in output lens module 130 is such that the individual homogenized beams of light from each of the light beams emitted from the light guides 104 are constrained to further overlap and mix as they leave the output lens module 130 providing a smooth, contiguous light beam with a wash light distribution with a large effective source (comprising the total output lens module 130) and true blending output distribution.

Figure 1:
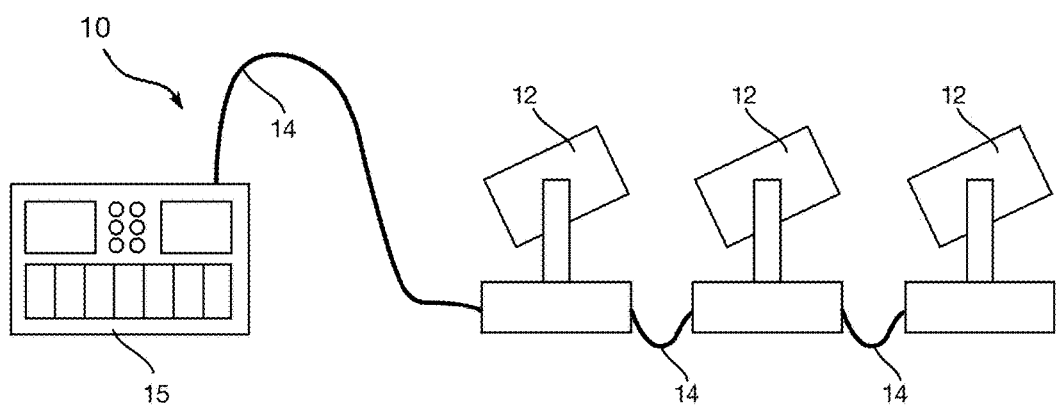
FIG. 1 illustrates a multiparameter automated luminaire lighting system.
Figure 11:
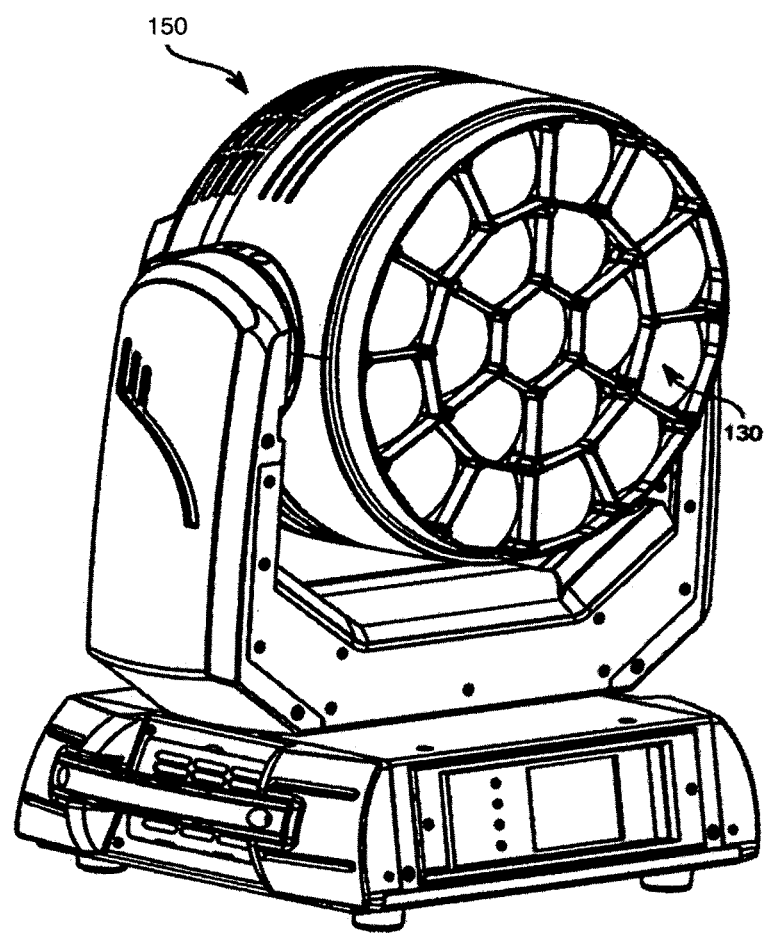
FIG. 11 illustrates a complete luminaire used in a lighting system illustrated in FIG. 1.

FIG. 11 illustrates a complete automated luminaire 150 as may be used in a lighting system such as that illustrated in FIG. 1. Lens array 130 is visible on the external face of the automated luminaire 150.

Figure 12:
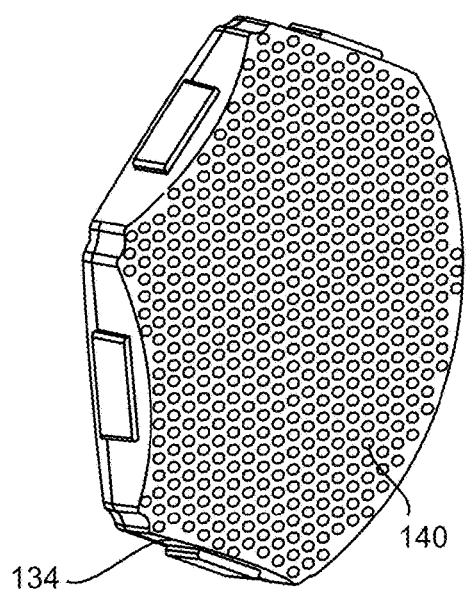
FIG. 12 illustrates detail of a lens of the optical system.

FIG. 12 illustrates a further embodiment of the output lenses 134 or 132 as may be used in the described system. As previously described, it is advantageous for such lenses to be achromatic in their behavior. In other words, they should present as little as possible difference between their optical effect on different colors of light to avoid objectionable colored fringing around the edge of light beams. In a preferred embodiment edge lens 134 comprises a single element constructed, by the use of aspheric surfaces or otherwise, to exhibit achromatic properties. In the embodiment illustrated in FIG. 12, the edge lens 134 does not have a smooth surface, instead there is a microstructure on the lens surface or surfaces. The lens surface or surfaces are covered with small engineered depressions similar to those on a golf ball. The depressions 140 are shown here larger than in reality for ease of illustration. In one embodiment the depressions 140 may be 0.3 mm-0.4 mm (millimeter) in diameter with a depth of only 0.0001 mm. These depressions 140, along with the use of aspheric lens surfaces, may be used on one or both sides of edge lens 134 so as to provide achromatic operation of the lens.

In operation of the luminaire, the LED sources feeding light guides 104 and light engine 120 may be individually or collectively controlled as to color and intensity to provide either a coordinated wash light or an effects unit as desired. In particular, any LED sources fitted with light engine 120 may be controlled such that either they produce the aforementioned dynamic flower effect, or produce a smooth wash beam to match standard light guides 104. The operator may choose to combine or mix these effects to achieve a desired result.

While the disclosure has been described with respect to a limited number of embodiments, those skilled in the art, having benefit of this disclosure, will appreciate that other embodiments may be devised which do not depart from the scope of the disclosure as disclosed herein. The disclosure has been described in detail, it should be understood that various changes, substitutions and alterations can be made hereto without departing from the spirit and scope of the disclosure.

What is claimed is:

1. An automated luminaire comprising:
   a light engine module with a central light beam axis and with a light emitting diode (LED) array light source generating a plurality of light colored beams;
   a collimating rod which incompletely homogenizes such that the colored beams visibly retain separation and individual color;
   a zoom lens system which receives light from the collimating rod and projects it with a 'flower' reminiscent effect; and
   an array of a plurality of additional light engine modules.

2. The automated luminaire of claim 1 where a plurality of the additional light engine modules have light integrators which fully homogenize the light such that the colored beams do not visibly retain separation and individual color and each of the plurality of the additional light engine modules employ a zoom lens system which receives light from the light integrators in each of the plurality of additional light engine modules.

3. An automated luminaire comprising:
   a light engine module with a central light beam axis and with a light emitting diode (LED) array light source generating a plurality of light colored beams;
   a collimating rod which incompletely homogenizes such that the colored beams visibly retain separation and individual color; and
   a zoom lens system which receives light from the collimating rod and projects it with a 'flower' reminiscent effect,
   where the zoom lens system comprises a single element system with at least one aspheric surface and at least one surface comprised of a microstructure of optically engineered depressions to provide an effectively achromatic performance.

4. The automated luminaire of claim 3 further comprising an array of a plurality of additional light engine modules.

5. An automated luminaire comprising:
   a first light engine module with a central light beam axis and with a light emitting diode (LED) array light source generating a plurality of light colored beams;
   a collimating rod which
      incompletely homogenizes such that the colored beams visibly retain separation and individual color,
      is articulated to rotate about the light beam axis,
      has a four-sided cross sectional shape with an entry port with a smaller area than exit port, and
      the exit port has a polished surface;
   a zoom lens system which receives light from the collimating rod and projects it with a 'flower' reminiscent effect; and
   an array of a plurality of additional light engine modules with light integrators which fully homogenize the light such that the colored beams do not visibly retain separation and individual color and each of a plurality of the additional light engine modules employ a zoom lens system which receives light from the light integrators in each of the plurality of additional light engine modules where the zoom lens system comprises a single element system with at least one aspheric surface and at least one surface with a microstructure of optically engineered depressions to provide an effectively achromatic performance.

* * * * *

UNITED STATES PATENT AND TRADEMARK OFFICE
CERTIFICATE OF CORRECTION

PATENT NO. : 10,132,992 B2
APPLICATION NO. : 15/089116
DATED : November 20, 2018
INVENTOR(S) : Pavel Jurik et al.

It is certified that error appears in the above-identified patent and that said Letters Patent is hereby corrected as shown below:

In the Specification

Column 2, Line 56 replace "FIG.1;" with --FIG. 1; and--

Column 2, Line 57 replace "system;" with --system.--

Column 4, Line 19 replace "Thus" with --Thus,--

Column 8, Lines 12 to 13 replace "with less distinct" with --with a less distinct--

Signed and Sealed this
Seventh Day of May, 2019

Andrei Iancu
*Director of the United States Patent and Trademark Office*